(12) United States Patent
Stevenson

(10) Patent No.: US 7,404,994 B2
(45) Date of Patent: Jul. 29, 2008

(54) LIDSTOCK MATERIAL HAVING IMPROVED BURST STRENGTH

(75) Inventor: James A. Stevenson, Pittsburgh, PA (US)

(73) Assignee: Reynolds Packaging LLC, Richmond, VA (US)

( * ) Notice: Subject to any disclaimer, the term of this patent is extended or adjusted under 35 U.S.C. 154(b) by 0 days.

(21) Appl. No.: 10/388,001

(22) Filed: Mar. 12, 2003

(65) Prior Publication Data
US 2004/0180160 A1 Sep. 16, 2004

(51) Int. Cl.
B29D 22/00 (2006.01)
B29D 23/00 (2006.01)
B32B 1/08 (2006.01)

(52) U.S. Cl. ............... 428/35.7; 428/35.8; 428/344; 428/347; 428/500; 428/461; 206/469; 206/531; 206/462; 206/463; 206/471

(58) Field of Classification Search ........ 428/35.8, 428/35.7, 66.3, 344, 403, 461, 463, 483, 428/522, 523, 355 AC, 347, 500; 220/359; 215/232; 206/469, 531, 462, 463, 471
See application file for complete search history.

(56) References Cited

U.S. PATENT DOCUMENTS

| | | | |
|---|---|---|---|
| 4,810,541 A | 3/1989 | Newman et al. | 428/36.7 |
| 4,876,156 A | 10/1989 | Hwo | 428/516 |
| 4,916,190 A | 4/1990 | Hwo | 525/227 |
| 5,066,543 A | 11/1991 | Hwo | 428/412 |
| 5,106,917 A * | 4/1992 | Lee et al. | 525/229 |
| 5,626,929 A | 5/1997 | Stevenson | 428/35.8 |
| 5,958,531 A | 9/1999 | Stevenson | 428/35.8 |

FOREIGN PATENT DOCUMENTS

CA 2197959 * 8/1998

* cited by examiner

Primary Examiner—Michael C Miggins
(74) Attorney, Agent, or Firm—Greenberg Traurig LLP

(57) ABSTRACT

A lidstock material suitable for sealing plastic containers that are retorted at elevated temperatures to sterilize their contents. The lidstock material comprises a substrate joined to a film comprising a mixture of a butene-1 polymer; high density polyethylene; polypropylene; and a powdered filler. The lidstock material is heat sealable, peelable, and retains high burst strength both during and after retorting at elevated temperatures.

1 Claim, 1 Drawing Sheet

LIDSTOCK MATERIAL HAVING IMPROVED BURST STRENGTH

FIELD OF THE INVENTION

The present invention relates to a lidstock material suitable for making lids to be sealed over plastic containers that are heated to sterilize their contents.

BACKGROUND OF THE INVENTION

Products that must be heated after being packaged in order to sterilize their contents include disposable contact lenses and some food products such as meats. Disposable contact lenses are usually packaged in blister packages consisting of 2 pieces: a base and a lid. The base is an injection molded plastic shaped to include a bowl-shaped or rectangular recess for receiving the contact lens. Each blister pack generally contains a contact lens and enough solution to prevent drying and to maintain the contact lens ready for use.

The lid covering the base is heat sealed over the recess containing the contact lens. Then the package is retorted in an autoclave to sterilize the contents. A lidstock material for the lid must possess sufficient burst strength during and after autoclaving to keep the package sealed so that contact lens solution does not escape throughout the shelf life of the blister pack. The lid must also be peelable from the base in order to provide easy access to the contact lens held within the blister pack.

Lidstock materials suitable for covering openings in packages for contact lenses and foods are known in the prior art. However, the prior art lidstock materials generally suffer from one or more serious disadvantages making them less than entirely suitable for their intended purpose.

A principal objective of the present invention is to provide a lidstock material for lids requiring improved burst strength.

A related objective of the invention is to provide a lidstock material for making heat sealable and peelable lids on plastic containers.

Additional objectives and advantages of the present invention will become apparent from the following detailed description of some preferred embodiments.

SUMMARY OF THE INVENTION

In accordance with the present invention there is provided a peelable and heat sealable lidstock material suitable for making lids for plastic containers. Plastic containers sealed by lids made in accordance with the invention are used for holding disposable contact lenses. Such containers are also suitable for holding meats such as beef, lamb, pork, and poultry, that are sterilized by retorting after being sealed in their containers.

As used herein, the term "lidstock material" refers to a metal, polymer, or paper substrate laminated with a heat seal layer or film. Lidstock material of the present invention is made into container lids by cutting the material into desired shapes such as rectangles. As used herein, the term "heat sealable" refers to the ability to form a bond between a plastic container and its lid when heat and pressure are applied locally for a sufficient time. The bond is gas-tight and preferably has sufficient burst strength to resist separation of the lid from the container body, even when the sealed container is retorted at an elevated temperature.

As used herein, the term "peelable" refers to the ability of a sealed lid to separate and to release from sealed engagement with a container body while both the lid and the body substantially retain their integrity. Such separation and release are achieved by manually applying a separating force to an outer edge portion of the lid.

The lidstock material of the invention preferably includes a metal substrate laminated with a film comprising a polymer mixture. The substrate is preferably an aluminum foil having a thickness of about 0.25 mil to 3.0 mils (0.00025 inch to 0.003 inch). Aluminum foil is preferred because it provides an excellent barrier against penetration of gases and moisture. Aluminum foil also protects the package contents from ultraviolet light and has an aesthetically pleasing appearance. A particularly preferred aluminum foil substrate has a thickness of about 2.0 mils (0.002 inch). Other suitable materials for the substrate include biaxially oriented polyethylene terephthalate (PET), nylon, paper, and combinations thereof.

The aluminum foil substrate is preferably coated with a print primer. The print primer facilitates application of printed labeling on the substrate. A particularly preferred print primer has a coating weight of about 0.7 pound per 3000 square feet.

The peelable and heat sealable film has a total weight of about 15-30 pounds per 3000 square feet. A particularly preferred film has a weight of about 17 pounds per 3000 square feet of the lidstock material.

The container body preferably comprises an injection molded propylene homopolymer. Other suitable plastics for the container body include polyethylene; polyethylene-polypropylene mixtures; and polyethylene-polypropylene copolymers.

The film in the lidstock material comprises a mixture of a butene-1 polymer; polyethylene; polypropylene; and a particulate inorganic filler.

Some suitable inorganic fillers include talc, amorphous silica and alumina trihydrate. The filler enhances peelablity of the coating by shifting seal failure upon peeling from adhesive failure at the container-coating layer interface to cohesive failure in the coating layer itself. The filler comprises at least about 18 wt. % of the coating, preferably about 20-40 wt. %, more preferably about 20-30 wt. % and optimally about 25 wt. %. The filler is preferably a powder having an average particle size of about 0.5-10 microns. Talc having an average particle size of about 1-2 microns is particularly preferred. The talc should be provided with a surface coating comprising about 0.5-5 wt. % of the filler, preferably about 1 wt. %. A carboxylic acid surface coating is particularly preferred.

The carboxylic acid in the surface coating may be a mono or dicarboxylic acid or a mixture of such acids. Some preferred acids include stearic acid and isostearic acid, which is a liquid mixture of mostly $C_{18}$ saturated fatty acids having the general formula $C_{17}H_{35}COOH$. Other saturated $C_{10}$-$C_{20}$ carboxylic acids or mixtures thereof may also be useful.

The mixture preferably comprises about 15-25 wt. % of a butene-1 polymer, more preferably about 20-35 wt. % of a butene-1 homopolymer. A particularly preferred polybutylene sold by Basell Polyolefins as "PB 0110" polybutylene has a density of 0.915 $g/cm^3$; a melt flow rate of 0.400 g/10 min by ASTM D 1238; and a melting point of 257° F. (125° C.).

The mixture preferably comprises about 35-55 wt. % high density polyethylene (HDPE), more preferably about 35-55 wt. %. The HDPE is preferably M6210 HDPE, available from Lyondell Petrochemical Company.

The mixture also comprises about 5-15 wt. % polypropylene.

DETAILED DESCRIPTION OF PREFERRED EMBODIMENTS

Figure 2:
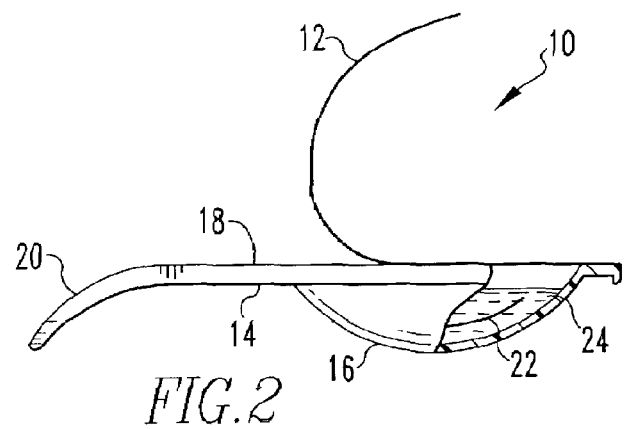
FIG. 2 is a side elevational view of the blister pack of FIG. 1 with the lid partially peeled back.
Figure 1:
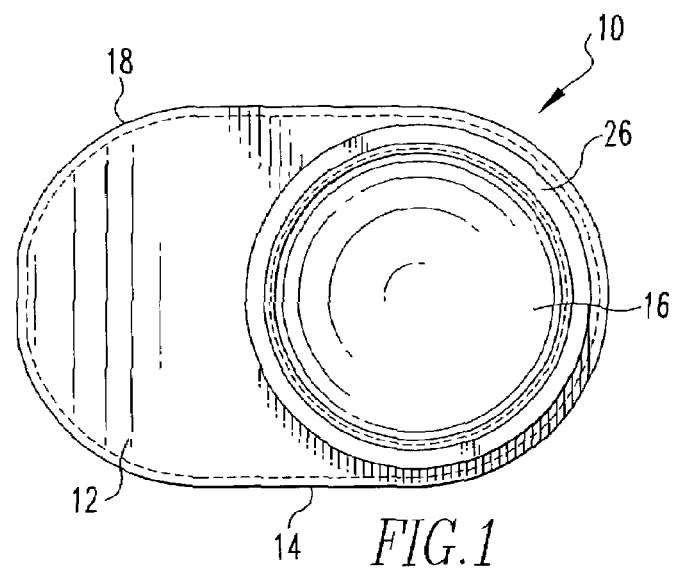
FIG. 1 is a top plan view of a blister pack made in accordance with the present invention.

In FIGS. 1 and 2 there is shown a blister pack 10 made in accordance with the present invention, with a lid 12 partially peeled back to reveal its contents. The pack 10 comprises an injection molded plastic body 14 heat sealed to the lid 12. The body 14 defines a bowl-shaped recess 16 having a diameter of about 2 cm. and a depth of about 0.5 cm. A flange 18 extending around the recess 16 includes a tapered curled lip 20 spaced apart from the recess 16.

The recess 16 houses a contact lens 22 and a saline solution 24. The recess 16 is circumscribed by a seal area 26 which is part of the flange 18. The lid 12 is preferably attached to the body 14 by heat sealing in the seal area 26. Other suitable means for attaching the lid 12 to the body 14 include induction sealing and sonic welding. The total interior volume defined by the recess 16 and the lid 12 is preferably less than 1 milliliter.

The body 14 is preferably made from a plastic material which can be shaped by injection molding or thermoforming. The plastic material for the body is preferably polypropylene but may also be other plastic materials having similar properties, such as polyethylene, polybutylene, polyesters (e.g. PET), polycarbonates, and other thermoplastics. Plastics having low vapor transmission rates are most preferred.

Figure 3:
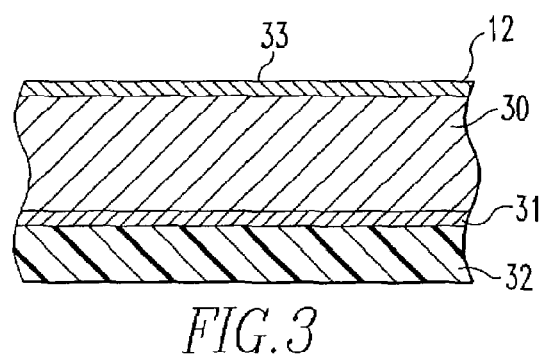
FIG. 3 is an enlarged fragmentary, cross-sectional view of the lid of the blister pack shown in FIG. 2.

Referring now to FIG. 3, the lid 12 is made from lidstock material comprising an aluminum foil substrate 30 having a polyurethane adhesive layer 31 joining a film 32 to the substrate 30. An exterior side of the substrate 30 displays graphic matter (not shown) printed over a print primer 33. The foil 30 has a thickness of about 2 mils. (0.002 inch). The print primer 33 has a weight of about 0.7 pounds per 3000 square feet. The film 32 has a thickness of about 1 mil., corresponding to a weight of about 17 pounds per 3000 square feet. The lid 12 includes only a single layer of the film 32.

The preferred blister pack 10 shown in FIGS. 1-3 has a lid 12 heat sealed to an injection molded polypropylene body 14.

The film 32 on the lid 12 may have either of the particularly preferred compositions shown in the following table.

| Film Composition | | |
|---|---|---|
| | Amount (wt. %) | |
| Ingredient | A | B |
| Butene-1 homopolymer | 25 | 15 |
| High density polyethylene | 35 | 55 |
| Polypropylene | 15 | 5 |
| Talc | 25 | 25 |
| Total | 100 | 100 |

Tests performed on blister packs made in accordance with the foregoing examples demonstrate that the lidstock material of the invention has excellent burst strength, both during the sterilization process and after the packages are sterilized by exposure to several cycles at 120° C. Among other requirements satisfied by the lidstock material are impermeability to bacteria so that sterility of the contents is preserved, a negligible vapor transmission rate to avoid loss of water, ability to maintain the lens in its original condition for an expected shelf life of about 2-4 years, and low variation in peel strength over an expected range of heat seal temperatures.

Having described the presently preferred embodiments, it is to be understood that the invention may be otherwise embodied within the scope of the appended claims.

What is claimed is:

1. A sterilizable blister pack capable of repeated retorting comprising:
   an injection molded body of a polypropylene homopolymer having an open cavity therein; and
   a lid over a portion of the body closing the open cavity within the body, wherein the body is heat sealed to the lid around the open cavity thereby sealing the cavity, the lid comprising an aluminum foil substrate, an adhesive layer fastening the substrate to a heat sealable film, wherein the film has a thickness of about 1 mil and consists essentially of a mixture of at least a filler, 20-35 wt. % butene-1 homopolymer, 35-55 wt. % HDPE, and 5-15% wt. % polypropylene.

* * * * *